Dec. 27, 1966  R. J. CURRY  3,293,761
COPY-FITTING DEVICE
Filed Sept. 20, 1965  5 Sheets-Sheet 1

INVENTOR.
Robert J. Curry
BY
Ralph R Roberts
AGENT

Dec. 27, 1966   R. J. CURRY   3,293,761
COPY-FITTING DEVICE
Filed Sept. 20, 1965   5 Sheets-Sheet 2

INVENTOR.
Robert J. Curry
BY
Ralph R. Roberts
AGENT

INVENTOR.
Robert J. Curry
BY
Ralph R. Roberts
AGENT

3,293,761
COPY-FITTING DEVICE
Robert J. Curry, 1 Richard Road, Metuchen, N.J. 08840
Filed Sept. 20, 1965, Ser. No. 488,580
19 Claims. (Cl. 33—150)

This invention relates to a device for fitting copy prepared on a typewriter to a layout wherein this copy is to be set in type.

In particular this invention relates to a device for effecting such fitting of typewritten copy into layouts of type intended to include both heading (upper case) and body or text matter (lower case). Even more particularly it relates to apparatus for effecting such fitting in layouts which are defined not only by width but also by depth.

According to this invention there is provided a device which has the general form of a pair of proportional dividers; that is, it has the form of two straight leg members joined one to the other by a shiftable pivot assembly. Attached to and as a part of this pivot assembly is a stop arm mechanism that, in effect, makes the device a graphic computer capable of adding, subtracting and dividing linear distances by graphic means and with no other measuring or computing needed. This stop arm provides a means for setting the distance between points at a selected distance and after being set to then be able to close the legs and then respread the points to the exact preselected distance originally set or any part less than this distance. This stop arm and its use will be related specifically to the copy art in the detailed description to follow. Each leg member has a pointed or edged element at each end and at least one of the leg members has one visible scale disposed lengthwise upon it which scale is readable against an indicator on the pivot assembly and which, while it may be of any number of specific designs, is in the broad sense one which is laid out according to a reasonable relation between length or depth of a given text composed on a typewriter and the length or depth of the same text set in type, with these lengths being measured as distances between the tips of the pointed or edged elements at corresponding ends of the leg members.

In one particular sense, this scale may be one which is laid out according to the aforementioned reasonable relation for text composed on a standard typewriter, a pica typewriter, for example, and text composed in a particular type face, Bodoni, for example, across a range of point sizes of this face. In another particular sense, this scale may be one which is laid out according to the aforementioned reasonable relation for text composed on a standard typewriter and text set in any type face having a particular basic distinguishing length or character count, length of alphabet of twenty-six characters or average number of characters per pica over an extended length of normal text, for example. For full utilization of a scale of the latter kind, such a scale being known as a "universal" scale, some auxiliary source of information is needed which provides data on basic distinguishing lengths and/or character counts for particular type faces in particular point sizes. Such sources of information are readily obtainable as booklet or tabular publications by the various type manufacturers.

Further according to this invention, at least one leg member of the device provided has at least one visible scale disposed lengthwise upon it which is readable against the pivot assembly indicator and which is based on the ratio of the depth between lines of text of determinate spacing, double spacing, for example, composed on a typewriter and the line-to-line depth to which type will or is to be set, across a range of point sizes, with these depths being measured as distances between the tips of the pointed or edged elements at corresponding ends of the leg members. Allowance is made for leading by simply adding the desired leading in points to the type size in points for purposes of establishing an indicator setting on the scale.

Application of scales to a copy fitting device according to this invention may be effected in a variety of ways. The scales may, for example, be bonded, engraved, painted, or printed directly upon the leg members of the device. Further, they may be prepared in strip form for easy insertion into and removal from slots or grooves in the leg members. As so prepared, there may be one or more than one scale on one side of a given strip or on both sides.

It is also contemplated that a copy-fitting device according to this invention have a pivot assembly which includes a clamping or locking mechanism to provide substantially positive retention of the assembly in any selected location lengthwise with respect to the leg members, and likewise maintain a selected angular relation between the leg members themselves in spread condition, this mechanism being easily releasable to allow shifting of the pivot assembly when desired.

It is further contemplated that a copy-fitting device according to this invention have a pivot assembly which includes a clamping or locking mechanism to provide substantially positive retention of the assembly in any selected lengthwise location with respect to the leg members, and likewise provide a frictional retention of the legs in any selected angular relation of the leg members, and further to provide an adjustable and lockable arm stop or index with which to use the device to add the total amount of type to be set.

These and other particular features of the copy-fitting device of this invention as well as its general nature and substance will be more clearly perceived and fully understood by referring to the following description and claims taken in connection with the accompanying drawings in which:

Referring now to the drawings in detail in which like numbers refer to like parts the embodiment illustrated in FIGS. 1 through 4 has an upper leg member 40 and a lower leg member 42. The upper surface of the upper leg member is provided with two longitudinally extensive grooves extending from a shoulder end portion, 43 and 44 to a reduced thickness end portion 45 at the other end of the upper leg 40. Pins 46 provide stops for the forward movement of slidably removable strip elements 48 and 50 which are insertable into the grooves whose ends are open on shouldered ends 43 and 44. The strip elements 48 and 50 preferably carry scales on their flat surfaces and in use are butted against stop pins 46 and are retained in their respective grooves by the friction of a close sliding fit. The lower surface (hidden) of lower leg member 42 is provided with grooves similar to those in the upper surface of the upper leg member 40 and strip elements 48 and 50 or strips of like or similar configuration may be mounted in these grooves. For apearance purposes all strip elements terminate substantially flush with the open ends of the grooves which, as shown, are also the shouldered ends 43 and 44. Cut-out regions such as semi-circular relief cuts 51, 52, 53 and 54 are provided in each leg member to allow thumb and finger gripping of strips such as strips 48 and 50 and for easy removal of these strips from the legs members.

Figures 1, 2:
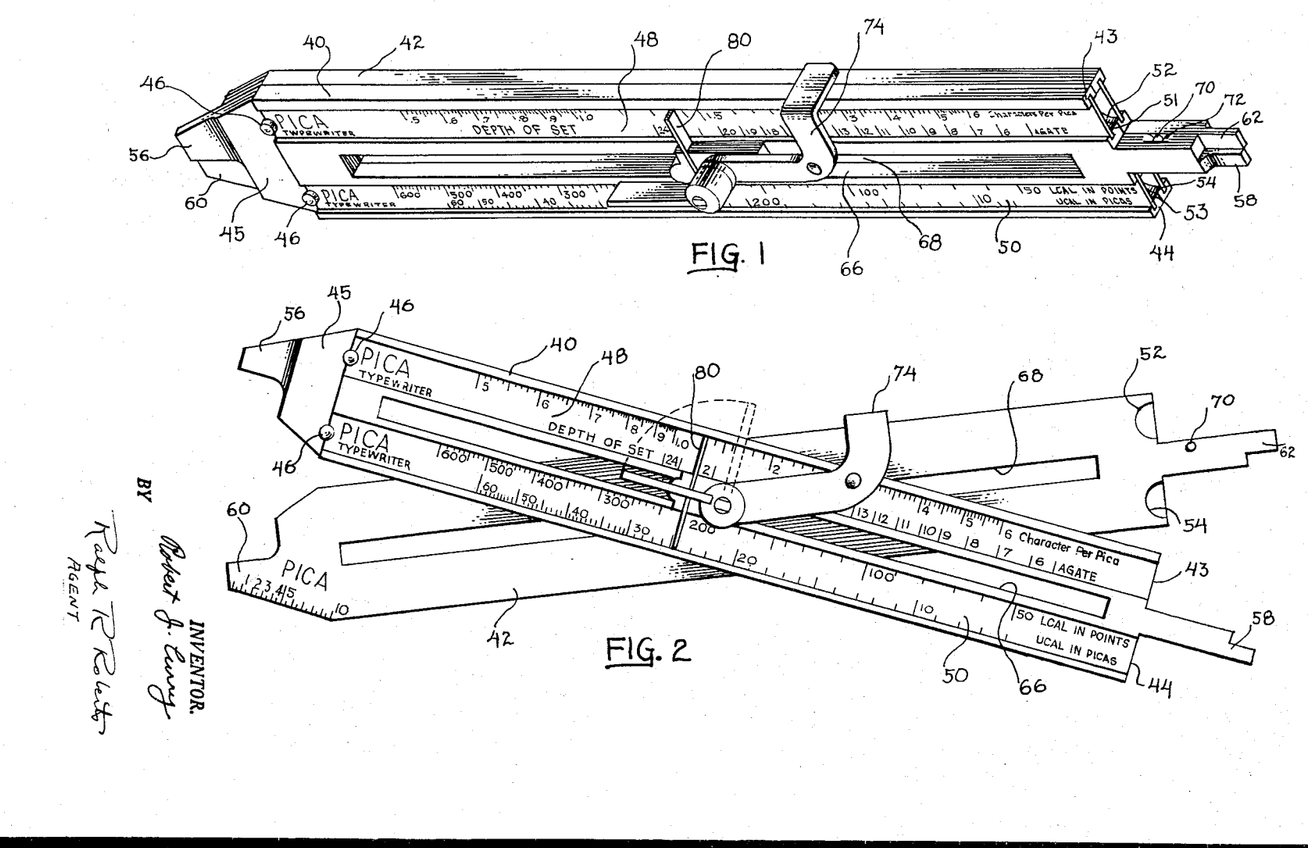
FIGURE 1 represents an isometric view of the copy-fitting device of this invention in which the pivot and index stop and leg members are shown in closed position.
FIGURE 2 represents a plan view of the device of FIG. 1 but with the legs and index stop in a partly open or measuring position.

It is to be noted that both upper and lower leg members 40 and 42 have their ends reduced to provide more or less pointed ends. The degree of point or edge is merely a matter of design selection or a removable point member (not shown) can be provided if desired. In the particular embodiment shown the leg elements terminate in edges rather than actual points. This is for the purpose of minimization of wear of these elements at their ends with resultant change in the distance between them as measured from end to end. Upper leg member 40 is provided with long and short points 56 and 58 which are similar to long and short points 60 and 62 provided on the lower leg member 42. Within very close limits, the end to end distance between points 56 and 58 must be the same as that between points 60 and 62.

Upper and lower leg members 40 and 42 are joined by a shiftable pivot assembly of a nature to be described hereinafter. It may be noted at this point, however, that this assembly includes a pivot pin or shaft 64 with respect to which lower leg member 42 can be rotated while upper leg member 40 can not. The upper and lower leg members are provided with through-going central and longitudinal slots 66 and 68 to accommodate shaft 64 as the pivot assembly is shifted. Additionally, lower leg member 42 is provided with an upwardly extending alignment pin 70 (FIG. 2) near one edge of the long point member 62, and upper leg member 40 is provided with a blind notch 72 (partially seen in FIG. 1) in the corresponding edge of its lower surface to receive this pin. Pin 70 and notch 72 are so located longitudinally on and in their respective leg members that when the leg members 40 and 42 are in parallel alignment as shown in FIG. 1 with pin 70 seated in notch 72 there is essentially exact alignment of the edged ends of long points 58 and 62 and, consequently, of the edged ends of short points 56 and 60.

Figures 3, 4, 5, 6, 7:
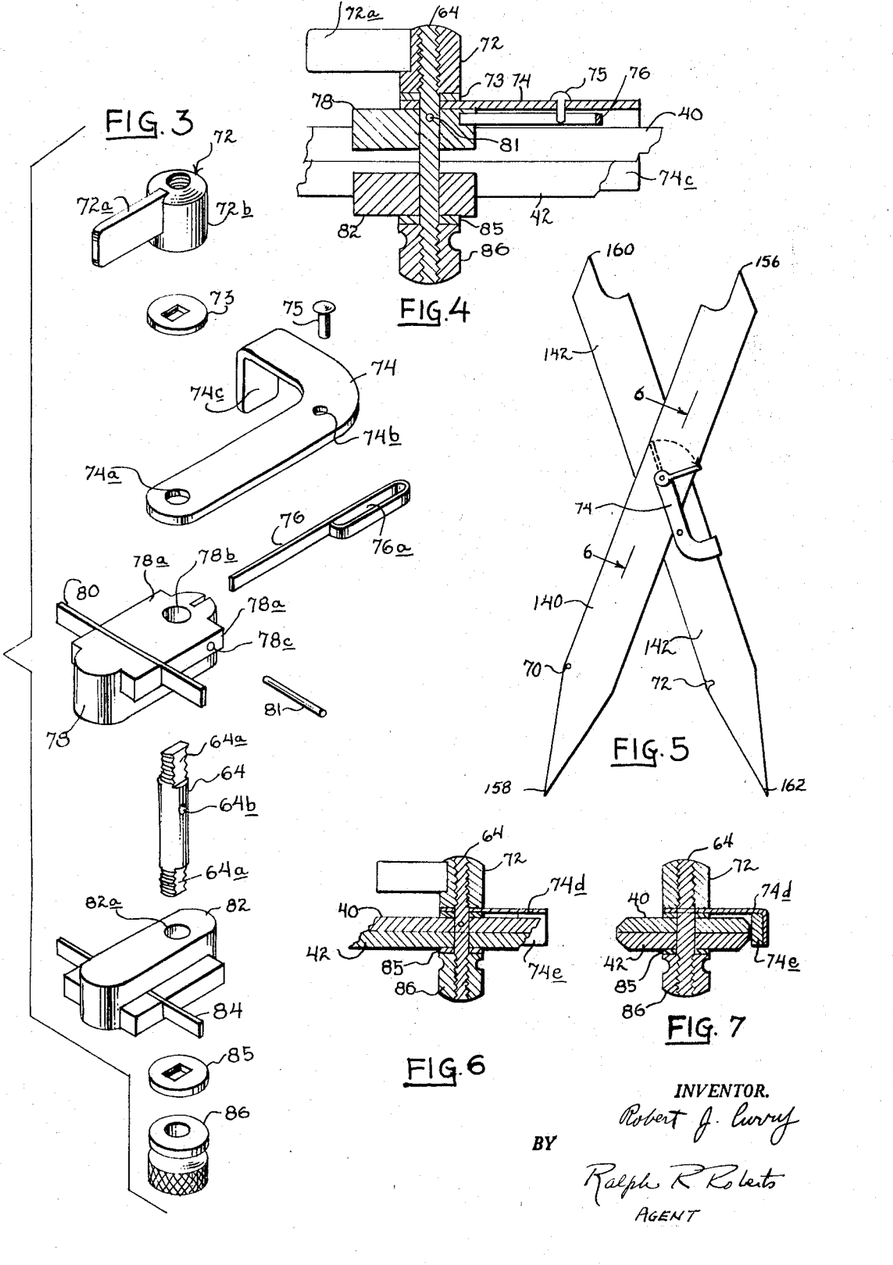
FIGURE 3 represents an exploded isometric view of the components forming one embodiment of the pivot assembly and index stop of this invention.
FIGURE 4 represents a sectional view through the assembled pivot, the view taken on a plane substantially equal distant from the longitudinal sides of the leg members.
FIGURE 5 represents a somewhat diagramatic plan view of an alternate copy-fitting device constructed to a fixed ratio or proportion which, as shown, is between pica (1.67 characters per pica) and elite typewriter (2.00 characters per pica) and utilizing a magnetic action rather than spring action to keep the stop arm in its proper position.
FIGURE 6 represents a fragmentary sectional view taken on the line 6—6 of FIGURE 5.
FIGURE 7 represents a sectional view on the line 7—7 of the pivot assembly of FIGURE 6 and taken on a plane transverse to the longitudinal plan of the legs.

The structure of the pivot assembly of the apparatus embodiment of this invention shown in FIGS. 1, 2, 3, and 4 will now be considered, reference particularly being had to FIGS. 3 and 4. On an element-by-element basis as shown in exploded FIG. 3, the pivot assembly comprises the following: the pivot pin 64, locking or clamping lever 72, upper washer 73, set arm 74, spring pin 75, spring 76, upper slide-block 78, upper guide-line strip 80, locking pin 81, lower slide-block 82, lower guide-line strip 84, lower washer 85, and clamping nut 86.

Locking lever 72 is essentially a threaded nut having a lever arm 72a by which finger manipulation can be performed to turn the nut portion 72b. The upper washer 73 and lower washer 85 are, in the present instance, of the same general configuration and may be either of fiber or metal. It is to be noted that these washers have apertures each having portions thereof which are parallel and straight and are adapted to slide upon and engage flats 64a formed on each end of pivot pin 64 which ends are threaded to accept the lever 72 and clamping nut 86.

Referring now to FIG. 4 as well as FIG. 3 the assembly of the pivot shows clamping lever 72 threadedly mounted on the upper end of pivot pin 64. Washer 73 is longitudinally slidable on pin 64 but by virtue of the engagement with flats 64a is non-rotatable in regards to the pin. Pivot pin hole 74a in set arm 74 is a rotatable fit on pin 64. From the end having the hole 74a the set arm extends as a flat member and has at a predetermined distance from the hole 74a a hole 74b sized so as to be a locking fit with pin 75. From this hole 74b the set arm bends to the left at substantially ninety degrees and continues in the same plane for a short distance whence it bends downwardly forming a stop tab 74c. Disposed immediately below the set arm 74 is upper slide-block 78 which has shoulder portions 78a extending outwardly from the main body portion which portion is a sliding fit in the through slot 66 in the upper leg member 40. The shoulders 78a provide means for assuring that the lower surface of block 78 does not extend beyond the lower surface of leg member 40. In alignment with the slot engaging sides of block 78 is pivot pin hole 78b which is a snug fit with pin 64. Transversely disposed with respect to hole 78b is a lock pin hole 78c which accepts locking pin 81. In assembly, pivot pin 64 is pushed into hole 78b and then hole 78c and locking pin hole 64b are aligned with each other whereupon locking pin 81 is inserted so as to keep pivot pin 64 from rotating and from moving longitudinally in block 78 as manipulative movements are made. Fixedly mounted in a slot in the upper surface of block 78 is the spring 76. The free end of this spring is formed into a closed guideway portion 76a and when set arm 74 is mounted on the pivot pin 64 the downwardly extending portion of spring pin 75 when mounted in arm 74 engages and is confined in the guideway portion 76a of the spring. Mounted in and press fitted in a slot in block 78 is guide-line strip 80 which may be of metal or plastic.

The lower slide block 82 is preferably the exact same configuration as slide block 78 except that block 82 does not have a lock pin hole nor does it have provision for receiving a spring such as spring 76. The pivot pin hole 82a is a rotating fit on pivot pin 64 and is positioned so that when the block 82 is mounted in lower leg member 42 and the block is mounted on the pin 64, the upper and lower leg members 40 and 42 will lie in adjacent planes and will slide past one another. Washer 85 is mountable upon the lower threaded end portion of the pivot pin 64 and engages the flats 64a as in the manner of washer 73 discussed above. Nut 86 is threadly mounted on the lower threaded portion of pin 64 and as it is tightened urges the washer 85 upwardly against block 82. Referring again to FIG. 4, it is to be noted that nut 86 is turned to adjust the frictional engagement of legs 40 and 42. The rotational movement of leg 42 is prevented from affecting the selected adjustment of nut 86 by the maintenance of the washer 85 in a non-rotational relationship to the pivot pin 64.

In use, the pivot assembly comprising the related elements shown in FIG. 3 is assembled as shown in FIG. 4 with slide block 78 engaging and holding upper leg member 40 while slide block 82 similarly holds and engages lower leg member 42. Manipulation of nut 86 to turn it so as to advance inwardly on pivot pin 64 causes washer 85 to move and carry upwardly the slide block 82 thereby bringing leg 42 to or against leg 40. Adjustment of nut 86 by the user provides the selected degree of frictional engagement between legs 40 and 42 so that the operator may have the desired stiffness of movement he wishes for a particular measurement situation. The other threaded end of pivot pin 64 has mounted thereon the locking lever 72 and uses this lever to lock set arm 74 at a desired position. Spring 76 urges stop tab 74c against the side of lower leg member 42 so that when the legs 40 and 42 are moved to form an X as in FIG. 2 the stop tab 74c will positively engage the side of the lower leg 42. When the legs have been moved to the desired spread the locking lever is moved from the dotted position to the solid outline shown position as in FIG. 5 whereby the lever 72 causes washer 73 to move downwardly to urge lock set arm 74 against the outer surface of block 78 and to lock the set arm 74 into the selected position. When this position is no longer desired the locking lever 72 is turned to move outwardly relaxing the pressure on washer 73 and permitting spring 76 to move the arm 74 to the original closed position or to a new set position.

It is to be noted at this time that washer 85 may be a "Belleville" washer so that the tension may be preset or to give a certain amount of residual bias tension. To shift the pivot to a different ratio the legs are brought to a position one above the other as in FIG. 1, and, with the alignment pin 70 in slot 72, the nut 86 is loosened so that blocks 78 and 82 may be slid longitudinally in the through slots 66 and 68. When guide strips 80 or 84 fall on the desired scale graduation the nut 86 is tightened to maintain the selected proportionalization and frictional engagement.

Reference is now had to the device of FIGS. 5, 6 and 7 wherein legs 140 and 142 are not made with through slots as are legs 40 and 42 but instead are made with pivot holes to accept the pivot pin 64. This proportioner thus has a fixed ratio and in the view shown is proposed that ends 156 and 160 shall measure pica typewriter text (having 1.67 characters per pica) and ends 158 and 162 shall then indicate an equivalent number of characters of elite typewriter text (having 2.00 characters per pica). Of course, a reversal of the ends would give an indication of the number of characters of pica when the operator measured the text of elite type. In this embodiment it is intended to utilize the magnetic action of magnet 74e instead of a spring with which to keep the stop arm 74 in position. It is to be further noted in FIG. 6 that the modification of FIG. 4 provides a set arm 74d which required no spring pin 75 and which eliminates spring 76. As seen in FIG. 7 arm 74d may have attached to it a magnet 74e which may be attracted to a responsive leg 142. In use as legs 140 and 142 are opened as in FIG. 5 the magnet 74e engages and follows the setting movement of arm 142 whence the setting or spreading of the legs is determined, the clamping lever 72 is turned to lock the arm 74 to arm 140 and arm 142 is movable within the limits of pin 70 and stop arm 74. In FIG. 7 the assembly of the pivot pin shows this pin 64 mounted in the bore of leg 140 and in particular the pin may be fixedly mounted therein by means of an epoxy cement or similar method. Such a cement would eliminate the requirement of the locking pin 81 and the attendant holes 78c and 64b.

Figure 8:
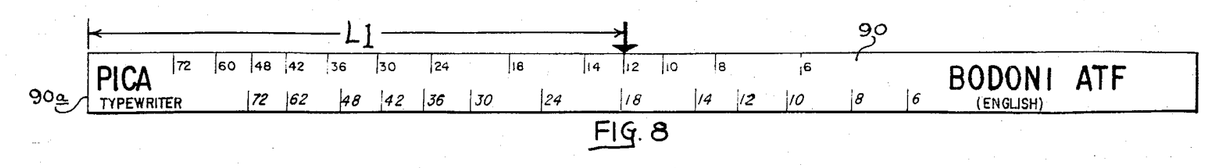
FIGURE 8 represents an enlarged plan view of a removable strip as shown in the upper leg member of the copy-fitting device of FIGURES 1 and 2, this strip carrying scales for converting lengths of lines from a pica typewriter to lengths in Bodoni capitals and lower case across a range of 6 to 72 points, American Type Founders (ATF) type.

Reference is now made to the scale portions of strips 48 and 50 as viewed in FIGS. 1 and 2 and which, for the sake of detailed description, is shown in FIGS. 8, 9, 10 and 11. It is to be understood that each exemplified strip can be inserted and removed from the longitudinal grooves in the exterior face portions of legs 40 and 42. In FIG. 8 the scale carrying strip is designated 90 and is shown independently of the upper leg element described above. At its left end, as seen in FIG. 8, the strip 90 terminates at an end surface 90a which surface is intended to be butted firmly against a shoulder pin 46 when the strip is mounted in a leg element. There are two scales on the visible side of this strip. These scales serve for converting lengths in Bodoni capitals and lower case across a range of 6 to 72 points, American Type Founders (ATF) type. Both scales are laid out in a direction along the strip consistent with measurement of lengths of typewritten lines between short points 56 and 60 only, and measurement of lengths of typeset lines between long points 58 and 62 only.

Near its right hand end, strip element 90 bears the legend "Bodoni-ATF." This legend designates the type face, or family of type faces across a range of point sizes, to which all scales appearing on the strip relate. At the left hand end of the scale appears a legend "Pica." At the right hand end of each scale appears either "uc" or "lc." These legends designate for each scale the particular case of the Bodoni type face, upper (capital) or lower, to which that scale relates. Determination of the position of any particular graduation mark of any given scale is effected experimentally, but nevertheless in a manner which is capable of providing highly accurate results for purposes of the present invention.

Suppose, for example, that the position of the 12 pt. mark of the scale for converting lengths of lines from a pica typewriter to lengths in upper case Bodoni ATF is to be determined. This mark is indicated by a heavy, downwardly pointing arrow in FIG. 8. As a first step, a normally reading text passage of reasonable length is selected. By a normally reading text passage is meant one having grammatically acceptable sentence structure in whatever language it is in which line length conversions between typewritten and typeset materials are expected to be made. English language is noted by legend on the scale-carrying strip of FIG. 8 near its right hand end. Also by a normally reading text passage is meant one in which no attempt has been made to either exaggerate or diminish the regular frequency of occurrence of any letter in the language in question. By a text passage of reasonable length is meant one sufficiently long that it does in fact substantially develop the regular frequency distribution of letters in the language in question.

The next step is to compose the selected text passage in typescript on a pica typewriter and determine its overall line length. One way of making this determination is by direct measurement. Another way is by counting the total number of characters, including punctuation marks and spaces, and dividing this total by ten to obtain overall line length in inches. The next step is to compose or set the selected text passage in upper case 12 pt. Bodoni ATF type and measure the overall line length which it occupies.

The next step is to measure the distance between the edged ends of long point 58 and short point 56 on upper leg member 40. The next step is to multiply the length between points 58 and 56 by the overall line length of the selected passage composed on a pica typewriter and divide the product by the sum of the overall lengths of the selected passage composed on a pica typewriter and set in upper case Bodoni ATF. The quotient is the distance from the edged end of short point 56 measured along the longitudinal center line of the upper leg member toward long point 58 at which the 12 pt. mark of the scale for converting lengths of lines of English text from a pica typewriter to lengths in upper case Bodoni ATF should be located when strip element 90 is in working position in leg member 40. The next step is to measure the distance along the centerline of upper leg member 40 from the edged end of short point 56 to the line or plane of shoulder surface 90a extended to meet the centerline of the upper leg member. The next step is to subtract this distance from the aforedetermined quotient. The resulting difference is the distance $L_1$ from end surface 90a of strip element 90 measured along the length of this element at which the 12 pt. mark of the scale for converting lengths of lines of English text from a pica typewriter to lengths in upper case Bodoni ATF should be located. The final step is to inscribe or otherwise make this mark upon the surface of strip element 90 in the proper location.

From the foregoing example it is believed to be apparent without additional explanation how all other graduation marks of the scale for converting lengths of lines of English text from a pica typewriter to lengths in upper case Bodoni ATF can be located on strip element 90. It is believed to be apparent further how the other marks of the other scale shown on this strip can be located for a lower case type being used in faces, for the same or different type faces made by other manufacturers (for example, Intertype Bodoni, Linotype Caslon Bold, Intertype Baskerville, or Linotype Spartan), and for line length conversions in languages other than English (for example, French, German, or Spanish). It is believed to be apparent even still further that scale construction of this nature is not limited to conversions between lengths of lines set in type and lengths of lines composed on either a pica typewriter, an elite typewriter, or indeed any standard typewriter as hereinbefore defined. Suitable scales can just as easily and just as accurately be constructed for conversions between lengths of lines set in type and lengths of lines composed on proportional spacing typewriters.

What results in each case with a scale-carrying strip element in working position and having its scale or scales oriented outwardly in either an upper or a lower leg member of the copy-fitting device of this invention is a leg member having at least one visible scale disposed lengthwise upon it which is readable against guide-line strip 80 or 84 on the pivot assembly and which is broadly laid out by sizes of type according to a reasonable relation between length of a given text composed on a typewriter and the length of this same text set in type, with the first of these lengths being measured as a linear distance between the short points of the copy fitting device, and the second being measured as a linear distance between the long points of this device. Of course it is to be understood that scales of the kind shown in FIG. 8 can be applied to the leg members of the copy-fitting device of this invention in ways other than that of being carried into it on a removable strip such as strip element 90. They may, for example, be bonded, engraved, painted or printed directly upon the upper and/or lower leg members. Arrangement on removable strip elements of scales for line conversions to and from lengths of lines set in particular type faces such as Bodoni, Futura, etc., is, however, considered to have advantages in respect of convenience, capacity, and, to some extent, of ease of manufacture of complete copy fitting devices according to the present invention.

Figure 9:
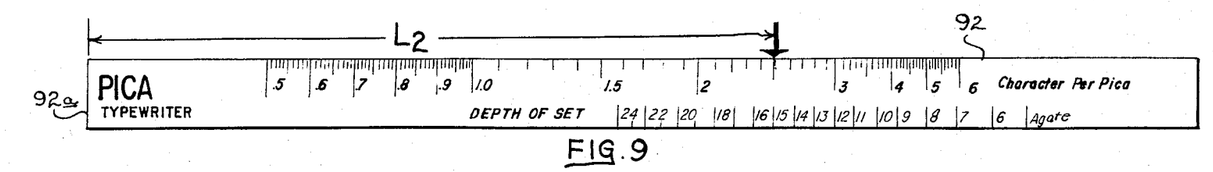
FIGURE 9 represents an enlarged plan view of a permanently affixed strip shown on the upper leg member of the copy-fitting device of FIGS. 1 and 2, this strip carrying a "universal" scale for converting lengths of lines from a pica typewriter to lengths in type on the basis of characters per pica, and carrying also a scale for converting depth of text prepared double spaced on a pica typewriter to depth in type across a combined type size and leading range of 6 to 24 points.

Referring next to FIG. 9, scale-carrying strip element 92 is shown independently of the upper leg member of the copy fitting device of this invention so far described in detail. In the following detailed description of this strip element and the scales which it carries, reference should be had as necessary to the earlier described figures.

At its left end as shown in FIG. 9, strip element 90 terminates at an end surface 92a. This surface is intended to be butted firmly against stop pins 46 of upper leg member 40 when the strip is in working position. There are two scales on the visible side of the strip, only one side of it ever being visible after it is installed since strip element 92 is intended to be permanently affixed to the upper leg member. One of the scales on strip element 92, the lower one, serves for converting depth of of text prepared double spaced on a pica typewriter to depth in type across a combined type size and leading range of 6 to 24 points. The other scale on strip element 92, the upper one, is a "universal" scale which serves for converting lengths of lines from a pica typewriter to lengths in type on the basis of characters per pica across a range of 0.5 to 6.0 characters per pica for the typeset material.

The upper scale on strip element 92 is laid out in a direction along the strip consistent with measurement of depth of typewritten text between short points 56 and 60 only, and measurement of depth of typeset text between long points 58 and 62 only. The lower scale on strip element 92 is laid out in a direction along the strip consistent with measurement of depth of typewritten lines between short points 56 and 60 only, and measurement of depth of typeset lines between long points 58 and 62 only. Near its left hand end, element 92 bears the legend "Pica." This legend designates for the top scale on the strip the particular typewriter to which it relates. At the left hand end of the lower scale appears the legend "depth of set." This legend designates the lower scale as one for depth-to-depth conversions between typewritten and typeset texts. At the right hand end of the upper scale appears the legend "Characters per Pica." This legend designates the lower scale as one for length-to-length conversions between typewritten and typeset lines across a range of characters per pica for the lines set in type.

Determination of the position of any particular graduation mark of the "depth of set" scale for pica typewriters is made in a manner which is capable of providing essentially mathematically exact results for purposes of the present invention.

The lower scale is adapted to measure the double spaced text composed on a pica typewriter which runs three lines to a vertical inch. Accordingly, the line-to-line spacing of such composition is one third of an inch. In typographic measure, one third of an inch is equal to two picas or twenty-four points. With this starting consideration and in the manner of determining $L_1$ as described above in respect to FIG. 8 it is believed to be apparent without further explanation how all other graduation marks of the "depth of set" scale for pica typewriters can be located on strip element 92. This "depth of set" can also be used for elite typewriters in view of the fact that text composed double spaced on an elite typewriter runs three lines to the vertical inch, just like that composed double spaced on a pica typewriter. Accordingly, the "depth of set" scale on strip element 92 will be exactly the same for both pica and elite typewriters, assuming of course that both are intended to serve for converting depth of typewritten text prepared double spaced to depth in type across a combined type size and leading range.

Some spacing other than double spacing could, of course, be used for scale construction purposes. It is, however, a working fact that writers of copy for eventual setting in type prepare their material essentially entirely in double spaced typewritten form. As a practical matter, therefore, the overwhelming number of "depth of set" scales will have to be suitable for use for depth conversions to and from double spaced typewritten material.

Determination of the position of any particular graduation mark of the "cpp" (characters per pica) scale for pica typewritters is made in a manner which is capable of providing essentially mathematically exact results for purposes of the present invention so far as construction of the scale alone is concerned. Utilization of the scale on the other hand, calling as it does for information of experimental or statistical accuracy from an auxiliary source concerning any particular type face, may give less than theoretically entirely accurate results as pointed out hereinafter. Nevertheless these results will be sufficiently accurate by a considerable margin for purposes of the present invention.

Suppose, for example, that the position of the 2.5-character mark of the "cpp" scale is to be determined. This mark is indicated by a heavy, downwardly pointing arrow in FIG. 9. Text composed on a pica typewriter runs ten characters to the lineal inch. Therefore, considering that there are six picas per inch, this particular typewriter composition runs 1⅔ or 1.67 characters per pica. Accordingly, with this starting consideration, the first step is to measure the distance between the edged ends of long point 58 and short point 56 on upper leg member 40. The next step is to multiply the distance between points 58 and 56 by 2.5 and divide the product by 4.17, that is, 2.5 plus 1.67. The quotient is the distance from the edged end of short point 56 measured along the longitudinal center line of the upper leg member toward long point 58 at which the 2.5-character mark of the "cpp" scale for pica typewriters should be located when strip element 96 is in working position on upper leg member 40.

The next step is to measure the distance along the center line of the upper leg member from the edged end of short point 56 to the plane of shoulder surface 92a extended to meet the centerline of the upper leg member. The next step is to subtract this distance from the aforedetermined quotient. The resulting difference is the distance $L_2$ from end surface 92a of strip element 92 measured along the length of this element at which the 2.5-character mark of the "cpp" scale for pica typewriters should be pocated. The final step is to inscribe or otherwise make this mark upon the surface of strip element 92 in the proper location.

From the foregoing example it is believed to be apparent without further explanation how all other graduation marks of the "cpp" scale for pica typewriters can be located on strip element 92. It is believed to be apparent also how the marks of a "cpp" scale for elite typewriters can be located on a corresponding strip element. However, in constructing a "cpp" scale for elite typewriters it must borne in mind that text composed on an elite typewriter runs twelve characters to the lineal inch or two characters to the lineal pica. Therefore, wherever in the foregoing example for pica typewriters the characters per pica value 1.67 was used the value 2.0 must be used in corresponding calculations for elite typewriters. From this it follows that the "cpp" scale for elite typewriters differs at least somewhat from that for pica typewriters.

The "cpp" scale shown in FIG. 9 may be used for line length conversions between material composed or to be composed on a pica typewriter and that composed or to be composed in any type face, for example 12-point Bodoni ATF, so long as the characters per pica value is known for the type face in question. In general, the first step in obtaining this value is to set a long text passage (hundreds or thousands of words) in type, the language of the setting being whatever is expected to be used later when line lengths are to be converted. The form of the composition is normal in that words are substantially entirely composed of lower case letters with capitals appearing only as initial letters of sentences, place names, and personal names. The next step is to measure the overall line length in picas. The next step is to count the total number of characters, including punctuation marks and spaces. The final step is to divide the total number of characters by the overall line length in picas, the quotient being the characters per pica value for that particular type face used in normal text composition.

The accuracy of this value depends upon the length of the text passage from which it is computed. However, as the value is computed and published for any particular type face by the manufacturer of that face its accuracy may be expected to be very high. In actual use of the copy-fitting device of this invention, of course, length conversions will be made frequently for single lines or at most a few lines rather than for text passages extending through hundreds or thousands of words. Within these single lines or few lines the manufacturer's characters per pica value for a particular type face may not obtain with absolute accuracy on account of special circumstances such as an abnormally extensive use of capital letters. However, in any instance where the material being subjected to line length conversion is typeset in normal text form it will in even fairly short lines exhibit a so nearly regular or manufacturer's characters per pica characteristic that the "cpp" scale may be used for conversion purposes with results of fully sufficient accuracy.

Construction of "cpp" scales is, of course, not limited only to those useful for conversions between lengths of lines set in type and lengths of lines composed on either a pica typewriter, an elite typewriter, or indeed any standard typewriter as hereinbefore defined. Suitable scales can be constructed quite accurately for conversions between lengths of lines set in type and lengths of lines composed on proportional spacing typewriters. In such a case the characters per pica value for the proportional spacing machine (the value corresponding to 1.67 for the pica typewriter and 2.0 for the elite typewriter) would be determined in essentially the same way as that for any type face, that is, by composing a long, normal text passage on the typewriter, measuring the overall line length in picas, counting the total number of characters including punctuation marks and spaces, and dividing the total number of characters by the overall line length.

Figure 10:
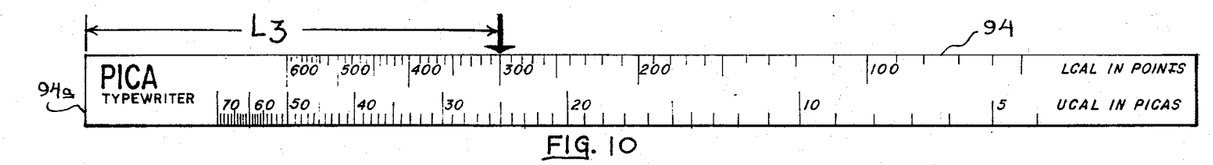
FIGURE 10 represents an enlarged plan view of a removably or a permanently affixed strip shown on the lower leg member of the copy-fitting device of FIG. 2, this strip carrying a "universal" scale for converting lengths of lines from a pica typewriter to lengths in type on the basis of upper case (capital) alphabet length in picas, and carrying also a "universal" scale for converting lengths of lines from a pica typewriter to lengths in type on the basis of lower case alphabet length in points.

Referring next to FIG. 10, scale-carrying strip element 94 is a universal scale for finding type width and utilizes the length of the alphabet of the particular type being set as expressed in points for "lower" case and "Picas" for capitals. These scales are transcribed from the "Characters per Pica" scale as this relationship between "Characters per Pica" and the alphabet is a constant factor readily found from existing charts supplied by type manufacturers. The upper scale, as seen in the drawing, is the lower case alphabet length in points and the lower scale is the "upper" case alphabet length in picas.

Figure 11:
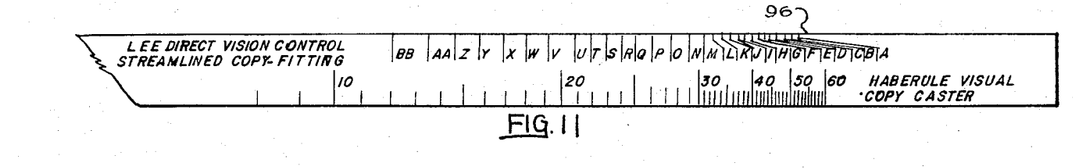
FIGURE 11 represents a plan view of a strip carrying "universal" scales for converting lengths of lines from a pica typewriter to lengths in type acording to the Haberule and Lee copy-fitting systems.

FIG. 11 is a universal type scale for finding type width expressed in the terms of two widely used compilations of type. As viewed, the upper scale is expressed in the Lee Direct Vision Control Streamlined Copy Fitting system which uses letters of the alphabet. An example of this notation system is that for twelve point ATF Bodoni "lower" case a value of "R" is given, and from their manual of this system the letter "R" has a "Character per Pica" value of 2.31 to 2.39 or a mean value of 2.35. The lower scale as viewed, is expressed in the units used by the Haberule Visual Copy Caster which are the "Characters per Pica" measurement of type expressed by ten as for example 2.0 would be twenty ($2.0 \times 10 = 20$) and is again transcribed from the original "Characters per Pica" scale.

Figures 12, 13, 14, 16, 17:
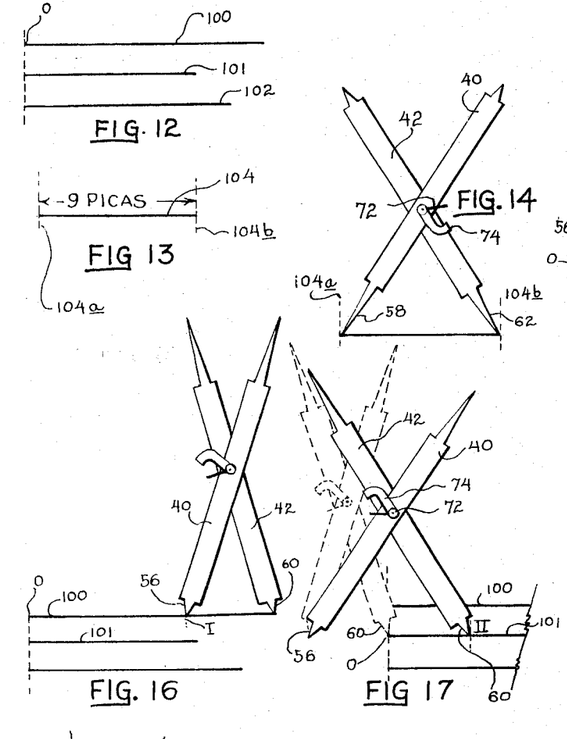
FIGURES 12 through 21 represent a graphic and somewhat diagrammatic series of steps for measuring a typed manuscript and determining the units that will set in a specific type of a specific width and where the units will "break"
Figure 15:
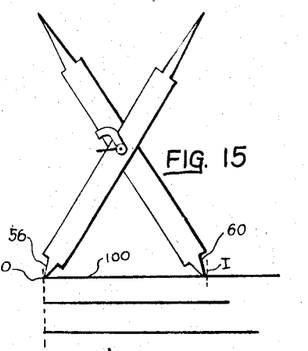

To use the device there is illustrated two procedures of converting typed manuscript into equally divided units of specific type. It is assumed that the manuscript has already been typed and as shown in FIGS. 12 through 21 the typed manuscript is converted into divided units of the amount that will set in a specific type and a specified width. Whereas we wish to "break" the typed (pica typewriter) manuscript having a multiplicity of lines represented as 100, 101 and 102 in FIG. 12 into 9 picas of eighteeen point lower case Bodoni (1.63 characters per pica) as represented by line 104 in FIG. 13 we set the guide line strip 80 on 1.63 on the "Characters per Pica" scale, FIG. 9, being sure to use the pica side of the scale for pica typewritten manuscript. We next set the points 58 and 62 on the ends 104a and 104b of line 104 as seen in FIG. 14, then the stop at 74 is locked by manipulation of clamping lever 72. Leave legs 40 and 42 spread this distance and turn the copy-fitting device end-for-end and measure off from point O on line 100 with the short leg points 56 and 60 and make a mark on line 100 and designate it as I (FIG. 15). Close legs 40 and 42 and hold short point 56 on mark I and open leg 42 until short leg point 60 reaches end of line 100 (FIG. 16). Legs 40 and 42 are left in the spread position of FIG. 16 and the short leg point 60 is placed at O on line 101 with the short leg point 56 to the left of the line so that the apparatus appears as in dotted outline of FIG. 17. Leg point 56 is then held and legs 40 and 42 are then spread until restrained by stop arm 72. Mark location of point 60 on line 101 as point II.

Figure 18:
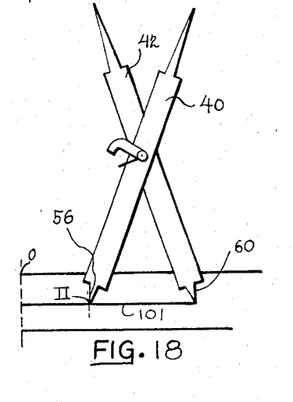
Figure 19:
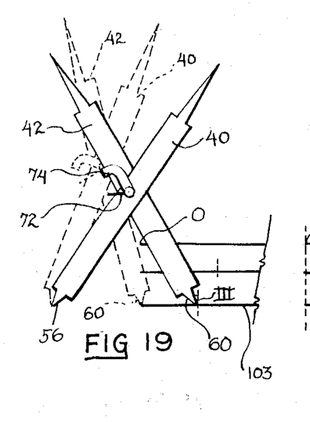
Figure 20:
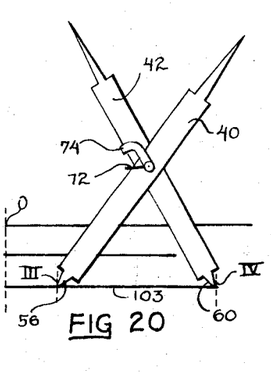
Figure 21:
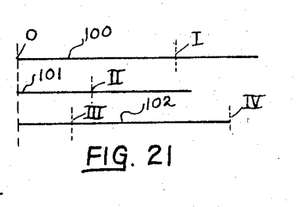

Legs 40 and 42 are now closed and short point 56 is then placed on mark II of line 101 and the legs are spread until the end of the line 101 is reached as in FIG. 18. Leaving the device with the legs spread this distance short leg point 60 is placed on line end O as shown in dotted line in FIG. 19. Short end 56 is then held and leg 42 is opened until the leg is restrained by stop arm 72 and the location of end 60 is then noted on line 103 as III (FIG. 19). Closing legs 40 and 42 we hold short leg point 56 on mark III and open leg 42 until either the end of the line is reached or stop arm 72 prevents further spreading. Mark location of end 60 as IV (FIG. 20). In FIG. 21 is illustrated where the lines of manuscript will "break," viz. O–I, I–II, II–III and III–IV, or a total of four lines. Of course if more typed manuscript were to be measured the above procedure would be continued until all the lines are measured and marked.

Figures 22, 23, 24:
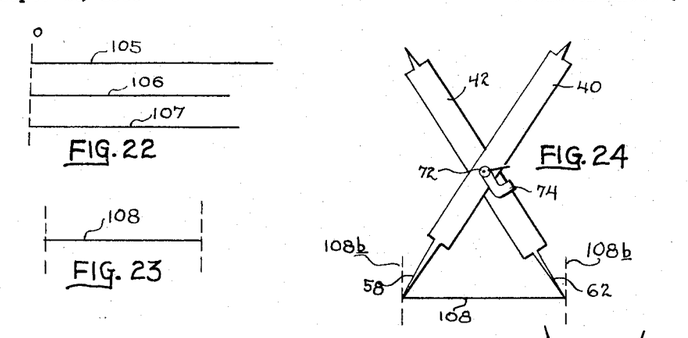
FIGURES 22 through 29 represent a graphic and somewhat diagramamtic series of steps for measuring a type manuscript and determining the units of type that will set in a specific type but not where they will "break."
Figure 25:
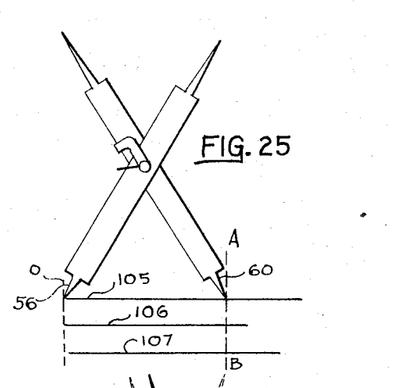
Figure 26:
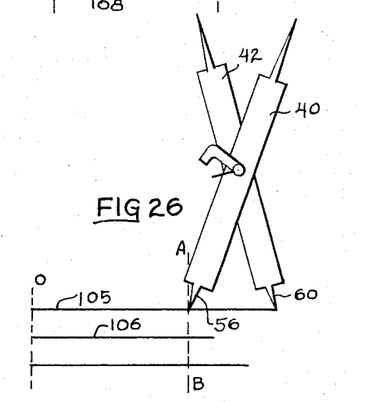
Figure 27:
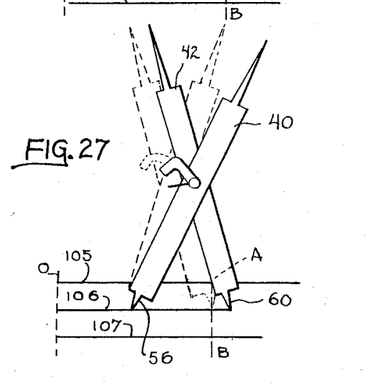
Figure 28:
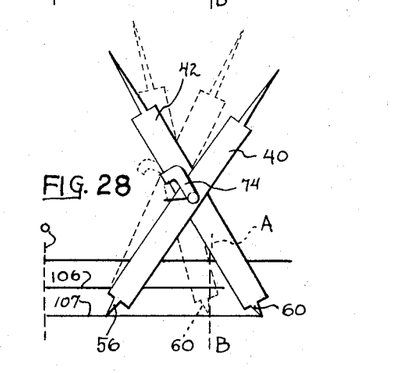
Figure 29:
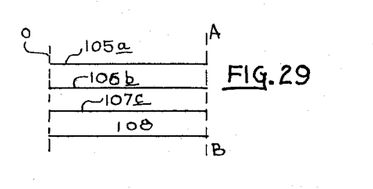

FIGS. 22 through 29 show another procedure of the copy fitting device in conjunction with the stop arm and a proper scale setting. FIG. 22 represents a series of lines 105, 106, and 107 the same as lines 100, 101 and 102 of FIG. 12. The line of FIG. 23 for the purpose of description is also of 9 picas as was line 104 of FIG. 13. This line shall be designated 108. As described in FIGS. 12–21 we again adjust the copy-fitting device with the pivot assembly being set with guide strip 80 set on 1.63 of the "Characters per Pica" of scale FIG. 9. Long points 58 and 62 are set on ends 108a and 108b of line 108 as in FIG. 24 and stop arm 74 is locked in place. Leaving the device spread as in FIG. 24 the device is turned end-for-end whereupon as seen in FIG. 25 the short end 56 is placed at point O and short end 60 at point A on line 105. Point A is marked and a light vertical line A–B is drawn as indicated by the dotted line AB seen in FIG. 25. Legs 40 and 42 are closed and the short point 56 is placed on point A on the line 105. Leg 42 is then opened until the short leg point 60 coincides with the end of the line 105 as seen in FIG. 26. The legs 42 and 40 are then left in this spread distance and as shown in dotted outline short leg point 60 is placed on mark AB of line 106. Short leg point 56 is then placed on line 106 and while holding this point leg 42 is opened until the short leg point reaches the end of the line 106 as seen in solid outline FIG. 27. Leaving the legs 40 and 42 in this spread distance, as shown in FIG. 28 in dotted outline, the point 60 is placed on mark AB on line 107 and short point 56 is placed to the left and on line 107. Holding short point 56 in place leg 42 is spread as in solid outline FIG. 28 and until point 60 reaches the end of line 107 or until restrained by stop arm 74. In the illustration of FIG. 28 the end of line 107 and the limitation of stop arm 74 on leg 42 coincide. The length between short points 56 and 60 as shown in solid outline in FIG. 28 is laid out on a line 108 as in FIG. 29 and, as represented, this line is substantially the same length as lines 105a, 106a, and 107a and hence the total of lines 105, 106 and 107 equal four lengths of line OA. The method of FIGS. 22 through 29 results in the same measuring computation as the method of FIG. 12 through 21 discussed above. It is to be noted, however, that the measuring method of FIGS. 22 through 29 gives only the total of lines and does not show where the lines will break as was shown in FIG. 21 discussed above.

While I have herein shown and described my invention in what I have conceived to be the most practical and preferred embodiment, it is recognized that departures may be made therefrom within the scope of this invention, which is not to be limited to the details disclosed herein but is to be accorded the full scope of the claims so as to embrace any and all equivalent devices.

Having described my invention herein, what I claim as new and desire to secure by Letters Patent is:

1. In a copy-fitting device having a general form of a pair of proportional dividers and having a first and a second leg member each having ends of a substantially pointed nature, each leg having through-going and longitudinal slots, and a shiftable pivot assembly joining the first and second leg members and movable in the slot to vary the length of leg portion extending from the pivot assembly, the improvement comprising (a) a slide means selectively movable in the slot of the first leg member; (b) a pivot pin carried by said slide means; (c) means for securing the pivot pin in relation to a first leg member so that said pivot pin is held in a non-rotatable relationship to the first leg member while simultaneously being held from axially longitudinal movement to the first leg member, (d) means for urging the leg members into frictional engagement with each other so as to control the ease of movement of the legs in relationship to each other, (e) a stop arm adjacent the first leg and rotatably carried by the pivot pin and movable as said pin and pivot assembly is moved in the slots, said arm having a stop tab adapted to engage the side of the second arm and at a predetermined relationship to the pivot pin regardless of the selected disposition of the pivot assembly in the slot, and (f) means for releasably locking the stop arm on the pivot pin.

2. A copy-fitting device as in claim 1 in which the means for urging the leg members into frictional engagement includes an adjustable means for urging the second leg member toward the first leg member and in which is provided means for urging the stop arm to move the stop tab into engagement with the side of the second leg member.

3. A copy-fitting device as in claim 2 in which the means for urging the stop arm into engagement with the leg member is a spring.

4. A copy-fitting device as in claim 2 in which the means for urging the stop arm into engagement with the leg member is a magnetic means.

5. In a copy-fitting device having a general form of a pair of proportional dividers and having a first leg member having ends of a substantially pointed nature and having a longitudinal slot intermediate the ends, a second leg member having ends of a substantially pointed nature and having a longitudinal slot intermediate the ends and a pivot assembly joining the first and second leg members, the improvement including said pivot assembly and comprising (a) an upper slide block adapted to slide in the longitudinal slot of the first leg member, the block having a therethrough passageway, (b) a pivot pin snugly retained in the through passageway of the upper slide block, (c) means for rigidly securing the pivot pin in the upper slide block, (d) a lower slide block adapted to slide in the longitudinal slot of the second leg member, the block having therethrough a passageway adapted to rotatably retain the pivot pin, (e) means adjustable for urging the slide blocks in each leg toward each other to provide frictional engagement of the leg members to each other to retain the leg members in a pre-selected relationship and provide the desired degree of ease of moving the legs in relationship to each other, (f) a stop arm adjacent the first leg and rotatably carried by the pivot pin, the arm movable as said pin and pivot assembly is moved in the slots, said arm having a stop tab adapted to engage the side of the second arm and at a predetermined relationship to the pivot pin regardless of the selected disposition of the pivot assembly in the slot, and (g) means for releasably locking the stop arm on the pivot pin.

6. A copy-fitting device as in claim 5 in which is provided means for urging the stop arm to move the stop tab into engagement with the side of the second leg member.

7. A copy-fitting device as in claim 6 in which the means for urging the stop arm into engagement with the leg member is a spring.

8. A copy-fitting device as in claim 6 in which the means for urging the stop arm into engagement with the leg member is a magnetic means.

9. In a copy-fitting device having a general form of a pair of proportional dividers and having a first leg member having ends of a substantially pointed nature and having a longitudinal slot intermediate its ends, a second leg member having ends of a substantially pointed nature and having a longitudinal slot intermediate its ends and a pivot assembly joining said first and second leg members the pivot assembly being shiftable at least part way between the ends of each of said leg members, the device comprising (a) an upper slide block adapted to slide in the longitudinal slot of the first leg member, the block having therethrough a passageway, (b) a pivot pin snugly retained in the through passageway of the upper slide block, (c) means for rigidly securing the pivot pin in the upper slide block, (d) a lower slide block adapted to slide in the longitudinal slot of the second leg member, the block having therethrough a passageway adapted to rotatably retain the pivot pin, (e) means adjustable for loosening the slide blocks in the slots so as to longitudinally shift the blocks in the slots and for urging the slide blocks in each leg toward each other to provide frictional engagement of the leg members to each other to retain the leg members in a pre-selected relationship and provide the desired degree of ease of moving the legs in relationship to each other, (f) indicator means carried by the pivot assembly for establishing the position of the assembly along at least a given one of said leg members, (g) a stop arm adjacent the first leg and rotatably carried by the pivot pin, the arm movable as said pin and pivot assembly is moved in the slots, said arm having a stop tab adapted to engage the side of the second arm and at a predetermined relationship to the pivot pin regardless of the selected disposition of the pivot assembly in the slot, (h) means for releasably locking the stop arm on the pivot pin, and (i) at least one scale disposed lengthwise along at least one of the faces of one of the leg members and readable against the indicator means of the pivot assembly.

10. A copy-fitting device as in claim 9 wherein the indicator means carried by the pivot assembly includes a guide line strip mounted in one of the slide blocks and adapted to be moved with the block as the pivot assembly is shifted, and in which is provided means for urging the stop arm to move the stop tab into engagement with the side of the second leg member.

11. A copy-fitting device as in claim 10 in which said scale is laid out by sizes of type according to the ratio between line-to-line depth of text of determinate spacing composed on a typewriter and the line-to-line depth to which type will set, with one of these depths being measured as a linear distance between one pair of corresponding ends of said leg members and the other of these depths being measured as a linear distance between the other pair of corresponding ends of said leg members.

12. A copy-fitting device as in claim 10 in which said scale is laid out according to a reasonable relation between length of a given text composed on a typewriter and length of the same text set in type, with one of these lengths being measured as a linear distance between one pair of corresponding ends of said leg members and the other of these lengths being measured as a linear distance between the other pair of corresponding ends of said leg members, and in which there is at least one other scale disposed lengthwise along at least one of said leg members and readable against the indicator means of said pivot assembly, said one other scale being laid out by sizes of type according to the ratio between line-to-line depth of text of determinate spacing composed on a typewriter and line-to-line depth to which type will set, with one of these depths being measured as a linear distance between one pair of corresponding ends of said leg members and the other of these depths being measured as a linear distance between the other pair of corresponding ends of said leg members.

13. A copy-fitting device as in claim 10 in which said scale is laid out by characters per unit length values of type in which the values are expressed according to the "Lee Direct Vision Control Streamlined Copy-Fitting" system.

14. A copy-fitting device as in claim 10 in which said scale is laid out by characters per unit length values of type in which the values are expressed according to the "Haberule Visual Copy-Caster" system.

15. A copy-fitting device as in claim 10 in which said scale is laid out by characters per unit length values of type and having two scales; one of which is expressed for type which is upper case type, and the other scale which is lower case type.

16. A copy-fitting device as in claim 10 in which said scale is laid out by the length of the alphabet in values such as picas and points.

17. A copy-fitting device as in claim 10 in which said scale is laid out so that the length of lines from a typewriter can be converted to length of lines in type on the basis of widths of character per pica.

18. A graphic computing device in the form of a pair of proportional dividers and having a movable stop arm with locking means for limiting the pivotal movement of one of two leg members in respect to the other leg member, the device having a first leg member having ends of a substantially pointed nature and a second leg member having ends of a substantially pointed nature with a pivot assembly joining the first and second leg members, the improvement including said pivot assembly and comprising (1) a pivot pin, (2) means for securing the pivot pin in relation to a first leg member so that said pivot pin is held in a non-rotatable relationship to the first leg member while simultaneously being held from axially longitudinal movement to the first leg member, (3) means for urging the leg members into frictional engagement with each other and to control the ease of movement of the legs in relationship to each other, (4) a stop arm adjacent the first leg, the arm provided with a stop tab adapted to engage the side of the second leg member, (5) means for urging the stop arm to move the stop tab into engagement with the side of the second leg member, and (6) means for releasably locking the stop arm on the pivot pin.

19. An attachment for use with a measuring device having the form of a pair of proportional dividers which includes a first and a second leg member each having a longitudinal slide receiving means formed therein and a pivot assembly joining said first and second leg members, the attachment providing a stop means arranged to be adjustably locked at a selected position so that graphic computations for adding, subtracting and dividing equal or unequal linear segments into a predeterminable total can be made in conjunction to a relationship of at least one of a specially developed scale which is mountable on at least one of the leg members, the attachment comprising (1) a pivot pin, (2) an upper slide member adapted to slide in and be retained in the slide receiving means of the first leg member, the slide member having therethrough a passageway adapted to snugly retain the pivot pin, (3) means for rigidly securing the pivot pin in the upper slide member, (4) a lower slide member adapted to slide in and be retained in the slide receiving means of the second leg member, the slide member having therethrough a passageway adapted to rotatably retain the pivot pin, (5) means adjustable for loosening the slide members in the slots so as to longitudinally shift said members in the slide receiving means and for urging the slide members in each leg toward each other to provide frictional engagement of the leg members to each other to retain the leg members in a pre-selected relationship and provide the desired degree of ease of moving the legs in relationship to each other, (6) a stop arm adjacent the first leg and rotatably carried by the pivot pin, the arm having a stop tab adapted to engage and be moved by the other leg, (7) means for releasably locking the stop arm on the pivot pin, and (8) at least one specially developed scale adapted to be read in conjunction with measuring and computing the length of copy, said scale disposed lengthwise along at least one of the faces of one of the leg members and readable against an indicator means movable in respect to the movement of the pivot assembly.

References Cited by the Examiner

UNITED STATES PATENTS

| 315,621 | 4/1885 | Holmes | 33—153 |
| 832,203 | 10/1906 | Kohler | 33—153 |
| 2,510,805 | 6/1950 | Dewey | 33—150 X |
| 2,682,709 | 7/1954 | Watson | 33—80 |
| 2,770,884 | 11/1956 | Eckert et al. | 33—150 |

LEONARD FORMAN, *Primary Examiner.*

W. D. MARTIN, *Assistant Examiner.*